J. K. BARNEY.
Cask Gage.
No. 21,809. Patented Oct. 19, 1858.
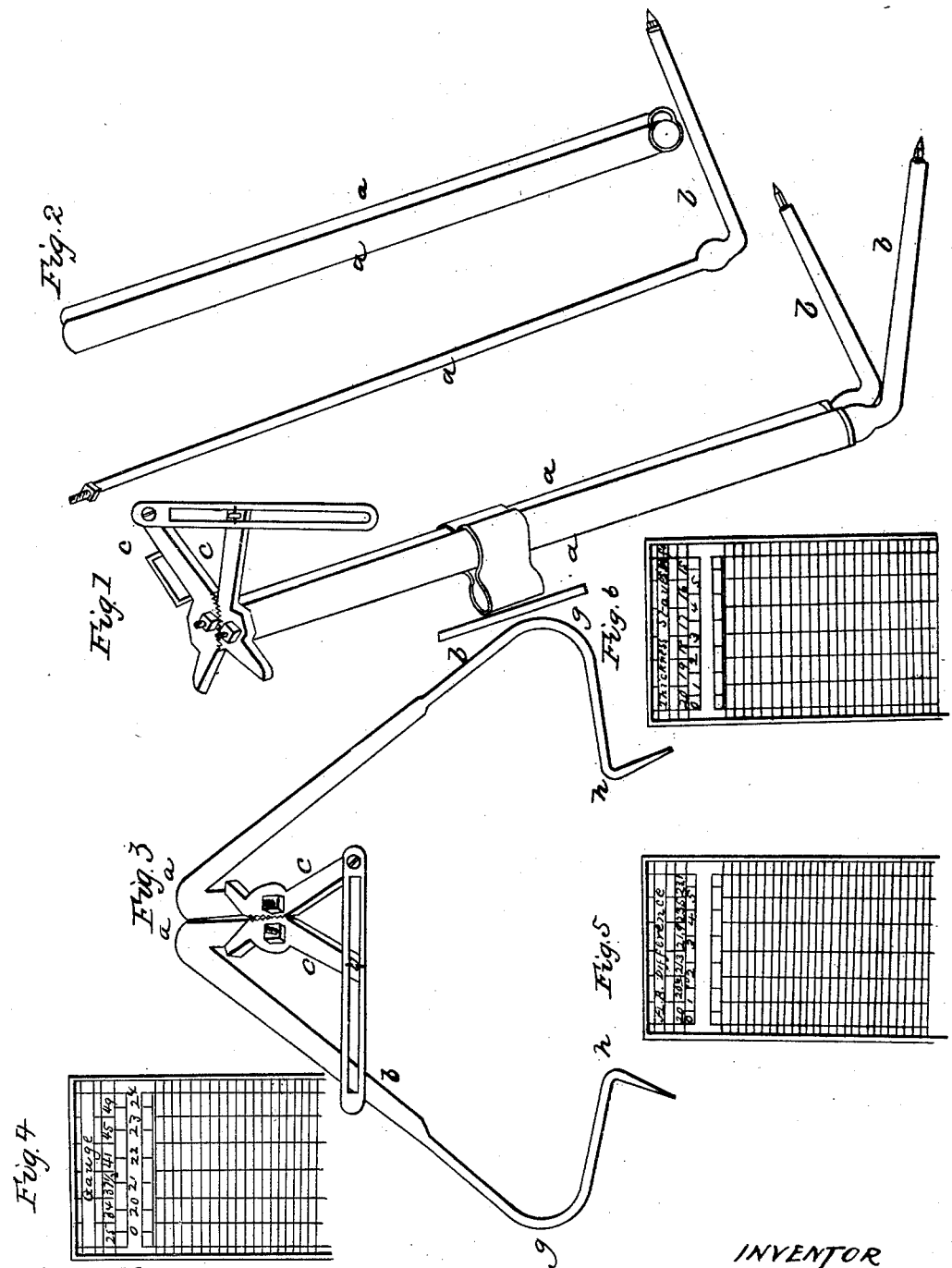
WITNESSES
INVENTOR
John K. Barney.

UNITED STATES PATENT OFFICE.

JOHN K. BARNEY, OF WARREN, RHODE ISLAND.

GAGE FOR CONTENTS OF CASKS, &c.

Specification of Letters Patent No. 21,809, dated October 19, 1858.

*To all whom it may concern:*

Be it known that I, JOHN K. BARNEY, of Warren, in the county of Bristol, in the State of Rhode Island, have invented a new and useful Machine for the Gaging of Casks and Ascertaining the Contents Thereof; and I do declare that the following is a full, clear, and exact description of the construction and operation of the same, reference being had to the annexed drawings, making a part of this specification, in which—

Figure I is a view of the instrument as used when open in the cask, Fig. II a view of a rod with the arm $b$ and the united tubes $a\ a$ as described, separately represented, Fig. III a view of the instrument as constructed for outside measurement, and Figs. IV, V and VI are views of the different faces of the tables and scale, used for ascertaining, by inspection, the contents of the cask, from the measurements made with the instrument, as hereafter described.

The body of the instrument is composed of two rods, inserted in hollow tubes marked $a\ a$ in the drawing, which tubes are united, so that the rods turn therein as upon a hinge, with arms on each end of the rods marked $b\ b$ and $c\ c$ in the drawing. The instrument when inserted in the cask, is opened so that the points of the arms $b\ b$ shall extend from head to head, and being turned around shall extend across the cask diametrically. Attached to the arms $c\ c$ is an index marked $d$ made to slide in an open bar, so adjusted and adapted, as to show the exact distance between the points of the arms $b\ b$ when extended as aforesaid in the cask. On the side of one arm $c$ is a socket, in which a rod may extend diagonally, to the point of the arm $b$, and will show when the point in the cask is in range with the bung.

By moving the instrument in the cask the measurement may be made either way across the cask, in as many different parts of it as may be necessary, taking the mean of the different admeasurements.

The points on the arms $b\ b$ are inserted into the arms with screws which serve to lengthen either arm, as the case may require, when the bung is not in the center, or the shape of the cask is such as to require the arms to be of different lengths. When one arm is to be lengthened, the point is let out by the screw, and a proper allowance made on the index; this adjustment being made before inserting the instrument in the cask.

By an instrument constructed upon the same principles, shown in Fig. III of the drawing, with points $h\ h$ to extend across the head to the chimes of the cask, and with diverging arms so curved, as, at the points $g\ g$, they shall clasp the bilge of the cask, and with a double index on the arms $c\ c$ to show both admeasurements, the contents of the cask are ascertained by exterior measurement, making due allowance for the thickness of the stave and head.

Accompanying the instrument are tables of calculations constructed by me by which on inspection, the contents of the cask are ascertained when the measurements are made, by means of a sliding scale adapted to the table, as in the drawing by Figs. 1, 2 and 3 is represented. By the table marked gage in the drawing, the contents are found thus: The left hand column of figures contains different lengths of casks from 25 inches upward. The figures on the slide represent different measurements of mean diameter. These quantities being found, the slide is so adjusted as to bring the cipher on the slide, under the figure in the left hand column, answering to the length of the cask. Then the figure on the slide answering to the mean diameter of the cask, will be immediately under the figure on the table, which answers to the contents of the cask.

By another table (marked "H. & B. difference") the mean diameter is thus found: In the left-hand column find the figure answering to the head diameter of the cask. On the slide find the bung diameter (the figure 1 being for 21, 2 for 22, &c.) and place the slide under the figure found in the left-hand column. Then the figure in the table immediately over the figure found on the slide, will be the mean diameter of the cask.

Another table (marked "Thickness of stave dif.") shows the contents of the cask with allowance for the thickness of the stave and head, when the measurement is on the outside of the cask. On this table, find in the left hand column, the figure answering to the outside diameter of the cask: Placing the slide under this figure, find the figure on the slide answering to the thickness of the stave and the figure immediately above on the table will show the true diameter of the cask. In the same manner the length of the cask minus the thickness of the head is found by this table.

What I claim as my invention and desire to secure by Letters Patent, is—

The double rods, with arms, tubes and index, as described, and their combination in the instrument, by which the cask is measured in length and diameter, outside or inside, in manner herein set forth and the construction of the tables with slides, by which is found by inspection, the mean diameter, the proper allowance for thickness of staves or head, and the quantity of contents of the cask from the given or ascertained admeasurements.

JOHN K. BARNEY.

Witnesses:
ALFRED BORNORTH,
W. C. BARNEY.